(12) United States Patent
Huang et al.

(10) Patent No.: US 12,423,474 B2
(45) Date of Patent: Sep. 23, 2025

(54) DATA PROCESSING METHOD, ELECTRONIC DEVICE AND NON-TRANSITORY COMPUTER READABLE STORAGE MEDIUM

(71) Applicant: HTC Corporation, Taoyuan (TW)

(72) Inventors: ChunKai Huang, Taoyuan (TW); Heng-Li Hsieh, Taoyuan (TW)

(73) Assignee: HTC Corporation, Taoyuan (TW)

( * ) Notice: Subject to any disclaimer, the term of this patent is extended or adjusted under 35 U.S.C. 154(b) by 168 days.

(21) Appl. No.: 18/479,840

(22) Filed: Oct. 3, 2023

(65) Prior Publication Data

US 2025/0111087 A1    Apr. 3, 2025

(51) Int. Cl.
| | |
|---|---|
| *G06F 21/62* | (2013.01) |
| *G06T 5/70* | (2024.01) |
| *G06V 10/44* | (2022.01) |
| *G06V 10/75* | (2022.01) |

(52) U.S. Cl.
CPC ............ *G06F 21/6254* (2013.01); *G06T 5/70* (2024.01); *G06V 10/44* (2022.01); *G06V 10/751* (2022.01)

(58) Field of Classification Search
CPC .. G06F 21/6254; G06V 10/751; G06V 10/44; G06T 5/70
See application file for complete search history.

(56) References Cited

U.S. PATENT DOCUMENTS

| | | | | |
|---|---|---|---|---|
| 2022/0406024 | A1* | 12/2022 | Shahrokni | ............ G06T 19/006 |
| 2022/0417446 | A1* | 12/2022 | Lee | ........................ G11B 27/28 |
| 2023/0039293 | A1* | 2/2023 | Tian | ..................... G06V 10/803 |
| 2023/0095621 | A1* | 3/2023 | Gorur Sheshagiri | .. G06V 20/46 382/103 |
| 2024/0111911 | A1* | 4/2024 | Trzynadlowski | ....... G06F 21/84 |
| 2024/0160777 | A1* | 5/2024 | Ahn | .......................... G06T 7/11 |
| 2024/0163081 | A1* | 5/2024 | Bosworth | ............. H04L 63/065 |
| 2024/0221306 | A1* | 7/2024 | Joseph | .................... G06V 40/18 |
| 2024/0273322 | A1* | 8/2024 | Karmi | ................. H04L 63/1483 |
| 2024/0273841 | A1* | 8/2024 | Shahrokni | ............... G06F 3/011 |
| 2024/0338486 | A1* | 10/2024 | Kalva | ..................... H04N 19/70 |
| 2024/0354962 | A1* | 10/2024 | Viehauser | ............... G06T 7/246 |
| 2024/0362893 | A1* | 10/2024 | Hassbring | .............. G06V 10/28 |
| 2024/0371043 | A1* | 11/2024 | Pujara | .................... G06V 10/25 |

(Continued)

FOREIGN PATENT DOCUMENTS

| | | |
|---|---|---|
| CN | 109120994 A | 1/2019 |
| CN | 113227940 A | 8/2021 |

OTHER PUBLICATIONS

The office action of the corresponding Taiwanese application No. TW113107987 issued on Jan. 2, 2025.

(Continued)

*Primary Examiner* — Stephen T Gundry (74) *Attorney, Agent, or Firm* — CKC & Partners Co., LLC (57) ABSTRACT

The present disclosure provides data processing method and electronic device. The data processing method is applicable to the electronic device in an environment. The data processing method includes: obtaining a key frame; in a condition that the key frame comprises at least one privacy content, processing the key frame to generate a modified key frame, wherein the modified key frame comprises at least one image processing area corresponding to the at least one privacy content; and using the modified key frame to update a map of the environment.

18 Claims, 6 Drawing Sheets

(56) References Cited

U.S. PATENT DOCUMENTS

| | | | | |
|---|---|---|---|---|
| 2024/0403484 A1* | 12/2024 | Becker | .................. | G06T 19/006 |
| 2024/0404068 A1* | 12/2024 | Liu | ........................... | G06T 7/11 |
| 2025/0004581 A1* | 1/2025 | Burns | ..................... | G06F 3/038 |
| 2025/0022485 A1* | 1/2025 | Zhu | ........................ | G11B 27/02 |
| 2025/0029379 A1* | 1/2025 | Richter | ............. | H04N 21/4524 |
| 2025/0037387 A1* | 1/2025 | Norris | ................. | G06F 3/04815 |
| 2025/0063390 A1* | 2/2025 | Shveki | .................. | G01S 5/0252 |
| 2025/0076964 A1* | 3/2025 | Raitarovskyi | ......... | H04W 76/10 |

OTHER PUBLICATIONS

Harim Lee et al., "Development of a Privacy-Preserving UAV System With Deep Learning-Based Face Anonymization", IEEE Access, IEEE, USA, vol. 9, Sep. 24, 2021 (Sep. 24, 2021), pp. 132652-132662, XP011880921, DOI: 10.1109/ACCESS.2021. 3113186.
Deeksha Dangwal et al., "Analysis and Mitigations of Reverse Engineering Attacks on Local Feature Descriptors", arxiv.org, Cornell University Library, 201 Olin Library Cornell University Ithaca, NY 14853, May 9, 2021 (May 9, 2021), pp. 1-13, XP081960392.
The EESR of the corresponding European application No. EP 24173022.5 issued on Oct. 14, 2024.
The Office Action of the corresponding European application No. EP 24173022.5 issued on Oct. 28, 2024.

* cited by examiner

DATA PROCESSING METHOD, ELECTRONIC DEVICE AND NON-TRANSITORY COMPUTER READABLE STORAGE MEDIUM

BACKGROUND

Field of Invention

This disclosure relates to a method and a device, in particular to a data processing method and an electronic device.

Description of Related Art

In the fields of spatial localization and tracking, those devices applying the visual-based Simultaneous Localization and Mapping (SLAM) technology are inevitable to obtain any type of private information such as, people, documents, etc. This private information is not only unable to help in performing spatial localization and tracking, but also affects the computational performance of the devices. Therefore, it is necessary to provide an approach to address the above issues caused by the private information.

SUMMARY

An aspect of present disclosure relates to a data processing method applicable to an electronic device in an environment. The data processing method includes: obtaining a key frame; in a condition that the key frame comprises at least one privacy content, processing the key frame to generate a modified key frame, wherein the modified key frame comprises at least one image processing area corresponding to the at least one privacy content; and using the modified key frame to update a map of the environment.

Another aspect of present disclosure relates to an electronic device. The electronic device includes an image processing circuit and a processor. The image capturing circuit is configured to capture a plurality of image frames. The processor is coupled to the image capturing circuit, and is configured to: set one of the plurality of image frames as a key frame; in a condition that the key frame comprises at least one privacy content, process the key frame to generate a modified key frame, wherein the modified key frame comprises at least one image processing area corresponding to the at least one privacy content; and use the modified key frame to update a map of an environment where the electronic device is.

Another aspect of present disclosure relates to a non-transitory computer readable storage medium with a computer program to execute a data processing method applicable to an electronic device in an environment. The data processing method includes: obtaining a key frame; in a condition that the key frame comprises at least one privacy content, processing the key frame to generate a modified key frame, wherein the modified key frame comprises at least one image processing area corresponding to the at least one privacy content; and using the modified key frame to update a map of the environment.

It is to be understood that both the foregoing general description and the following detailed description are by examples, and are intended to provide further explanation of the invention as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiments are described in detail below with reference to the appended drawings to better understand the aspects of the present application. However, the provided embodiments are not intended to limit the scope of the disclosure, and the description of the structural operation is not intended to limit the order in which they are performed. Any device that has been recombined by components and produces an equivalent function is within the scope covered by the disclosure.

As used herein, "coupled" and "connected" may be used to indicate that two or more elements physical or electrical contact with each other directly or indirectly, and may also be used to indicate that two or more elements cooperate or interact with each other.

Figure 1:
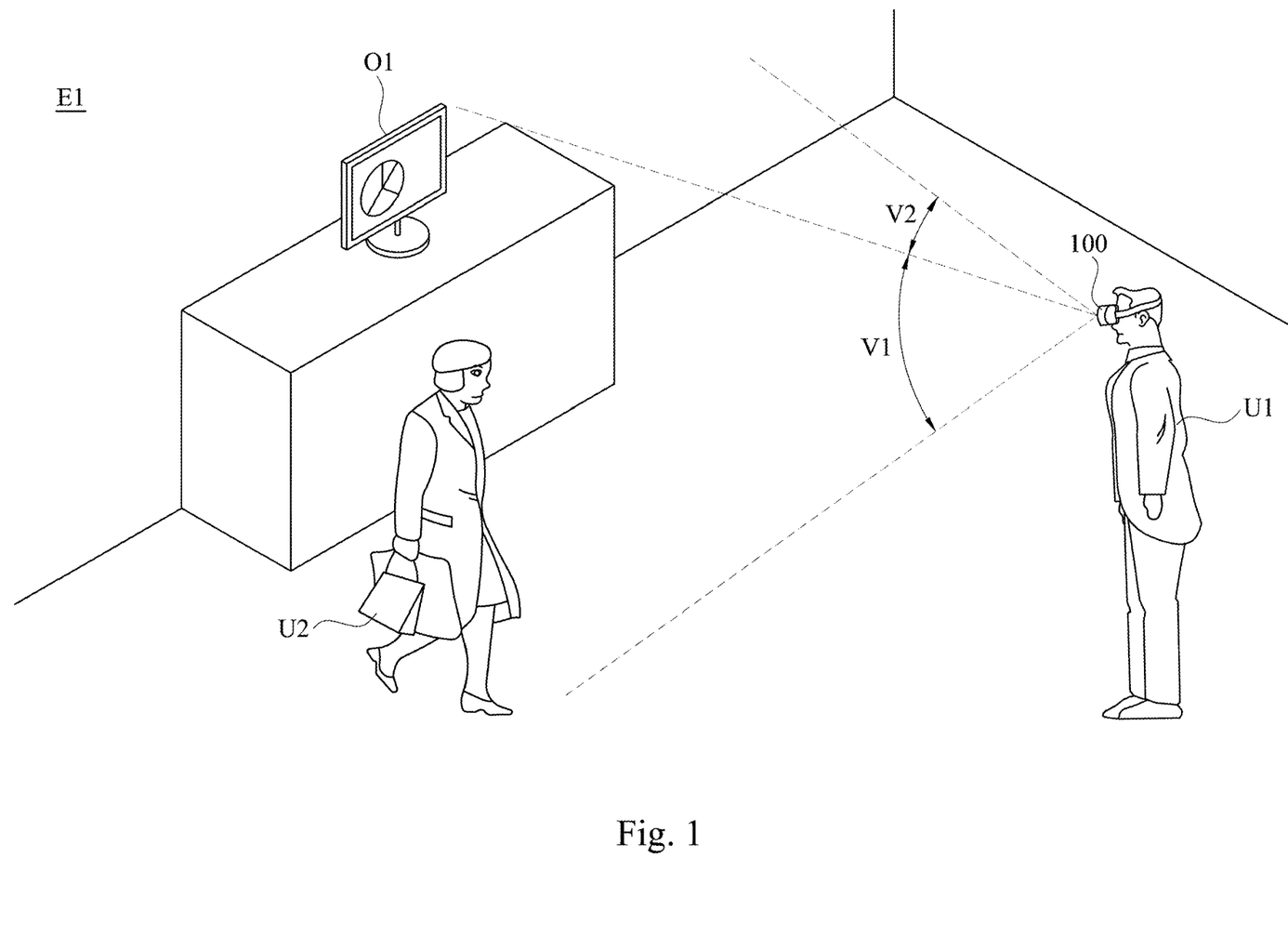
FIG. 1 is a schematic diagram of an environment where an electronic device is in accordance with some embodiments of the present disclosure.

Referring to FIG. 1, FIG. 1 is a schematic diagram of an environment E1 where an electronic device 100 is in accordance with some embodiments of the present disclosure. In some embodiments, the electronic device 100 is a head-mounted device (HMD). Thus, as shown in FIG. 1, the electronic device 100 can be mounted on head of a user U1 in the environment E1 such as a public place, a gaming place, a workplace, etc.

In some embodiments, the electronic device 100 can provide an immersive content (not shown) for the user U1. The electronic device 100 might occlude the direct visibility of the user U1 to the environment E1, and the immersive content can correspondingly be a virtual reality (VR) environment, or a mixed reality (MR) environment. In particular, the MR environment simulates the environment E1 and enables an interaction of virtual reality objects (which cannot be directly seen in the environment E1 by the user U1) with a simulated environment. However, the present disclosure is not limited herein. For example, the electronic device 100 might not occlude the direct visibility of the user U1 to the environment E1, and the immersive content can correspondingly be an augmented reality (AR) environment. In particular, the AR environment augments the environment E1 directly seen by the user U1 with the virtual reality objects.

In accordance with the above embodiments, the user U1 might control the virtual reality objects in the immersive content by operating at least one controller (not shown) or by making hand or eye movements. In particular, the at least one controller is wirelessly connected to the electronic device 100, and the hand or eye movements would be sensed and recognized by the electronic device 100.

As can be understood, the electronic device 100 is not limited to be the HMD. For example, in some embodiments, the electronic device 100 can be an autonomous mobile robot such as a clean robot, a sweeping robot, a food delivery robot, etc. All in all, the electronic device 100 can be a device capable of localizing itself in the environment E1.

Figure 2:
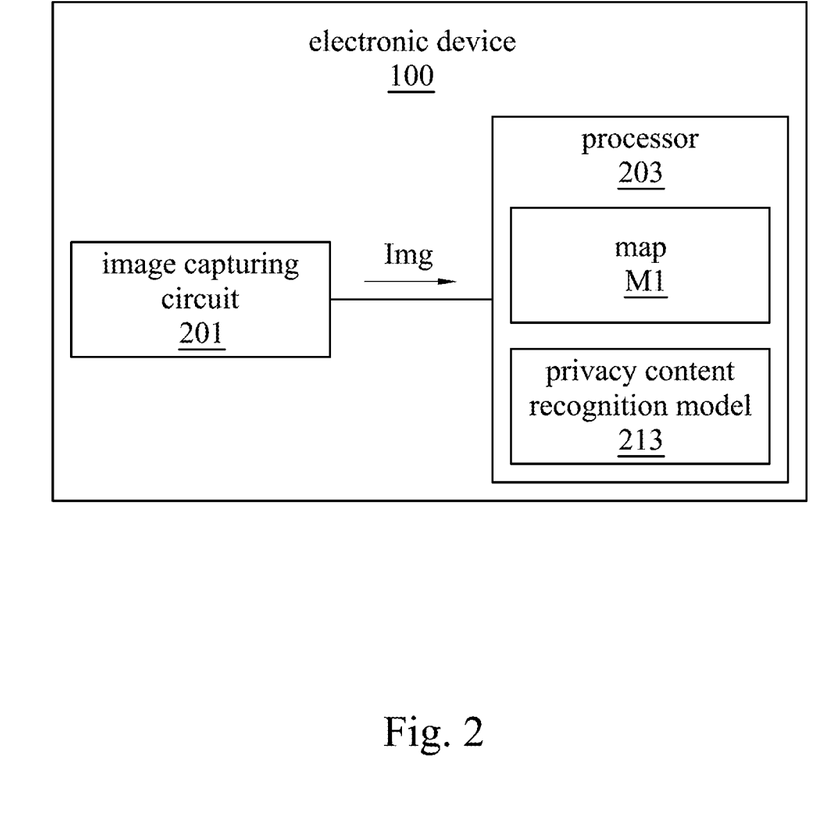
FIG. 2 is a block diagram of the electronic device in accordance with some embodiments of the present disclosure.

Referring to FIG. 2, FIG. 2 is a block diagram of the electronic device 100 in accordance with some embodiments of the present disclosure. In some embodiments, as shown in FIG. 2, the electronic device 100 includes an image capturing circuit 201 and a processor 203. The processor 203 is electrically coupled to the image capturing circuit 201.

In some embodiments, the image capturing circuit 201 is configured to capture image frames Img. In particular, the image capturing circuit 201 can be implemented by at least one camera device, or other structure including multiple components such as lens, image sensor, image processor, etc.

In some embodiments, the processor 203 is configured to localize the electronic device 100 in the environment E1 by some visual-based localization technologies (e.g., Simultaneous Localization and Mapping (SLAM), etc.). By those visual-based localization technologies, the processor 203 uses the image frames Img received from the image capturing circuit 201 to generate and/or update a map M1 of the environment E1 and to calculate location and/or pose of the electronic device 100 in the map M1. In particular, the processor 203 can be implemented by central processing unit (CPU), graphic processing unit (GPU), application-specific integrated circuit (ASIC), microprocessor, system on a Chip (SoC) or other suitable processing circuits.

Due to those visual-based localization technologies, the electronic device 100 might accidentally obtain some privacy information from the environment E1. In the embodiments of FIG. 1, the privacy information can be, for example the portrait of a person U2 in the environment E1, the visual content displayed by a display O1 in the environment E1, etc. This privacy information might be carried by some of the image frames Img. If the processor 203 uses those image frames Img carrying the privacy information to generate and/or update the map M1 and to calculate the location and/or the pose of the electronic device 100, the computational complexity and burden of the processor 203 might be increased. For example, the person U2 in the environment E1 might be conspicuous in the environment E1 and/or might have an unpredictable movement, which affects the image feature extraction. Also, when the electronic device 100 is going to share information with other devices, the electronic device 100 has to further perform the encryption to prevent this privacy information from breach if those image frames Img carrying the privacy information would be shared. As can be understood, the privacy information can be referred as confidential information or sensitive information.

In view of above issues caused by the privacy information, as shown in FIG. 2, the processor 203 is configured to use a privacy content recognition model 213 to perform an image recognition on some of the image frames Img. In some embodiments, the privacy content recognition model 213 is a neural network model (e.g., convolutional neural network (CNN) model, multi-layer perceptron (MLP) model, etc.) that has been well-trained to recognize privacy contents from images. Based on the result of the image recognition, the processor 203 can selectively process and analyze those image frames Img being recognized. By such operations, the processor 203 can perform further operations (e.g., generating and/or updating the map M1, calculating the location and/or the pose of the electronic device 100, etc.) without using the privacy information. Thus, the electronic device 100 can avoid the above issues. The operations of the processor 203 would be described in detail below with reference to FIG. 3.

In some embodiments, a training data set might be first used to adjust parameters of the privacy content recognition model 213. The training data set is composed of multiple training images, in which each training image includes at least one label indicating the privacy content in the training image. A validation data set might then be used to adjust hyperparameters of the privacy content recognition model 213. After the privacy content recognition model 213 is well-adjusted by the training data set and the validation data set, a test data set might be used to evaluate the performance of the privacy content recognition model 213. In such way, the privacy content recognition model 213 can learn to recognize the privacy contents from the images. In addition, the training of the privacy content recognition model 213 may be completed before the official use of the privacy content recognition model 213.

In some embodiments, the electronic device 100 can further include a storage circuit (not shown), in which the storage circuit can be implemented by volatile memory, non-volatile memory, or the both. The map M1, the privacy content recognition model 213 and the image frames Img captured by the image capturing circuit 201 can be stored in the storage circuit, and can be accessed by the processor 203.

Figure 3:
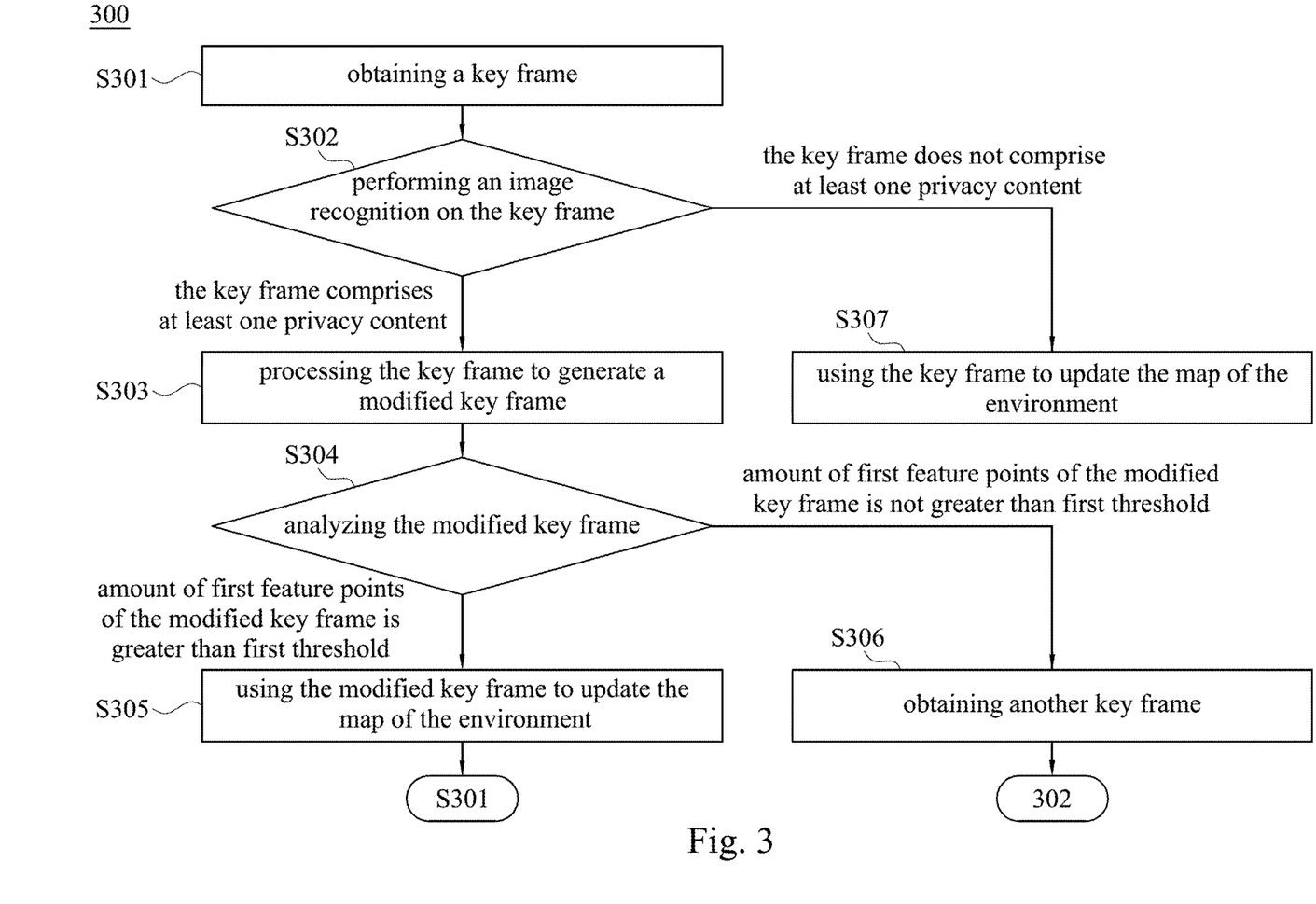
FIG. 3 is a flow diagram of a data processing method in accordance with some embodiments of the present disclosure.

Referring to FIG. 3, FIG. 3 is a flow diagram of a data processing method 300 in accordance with some embodiments of the present disclosure. The data processing method 300 can be performed by the processor 203 of the electronic device 100. In some embodiments, as shown in FIG. 3, the data processing method 300 includes steps S301-S307. However, the present disclosure should not be limited herein.

Figure 4:
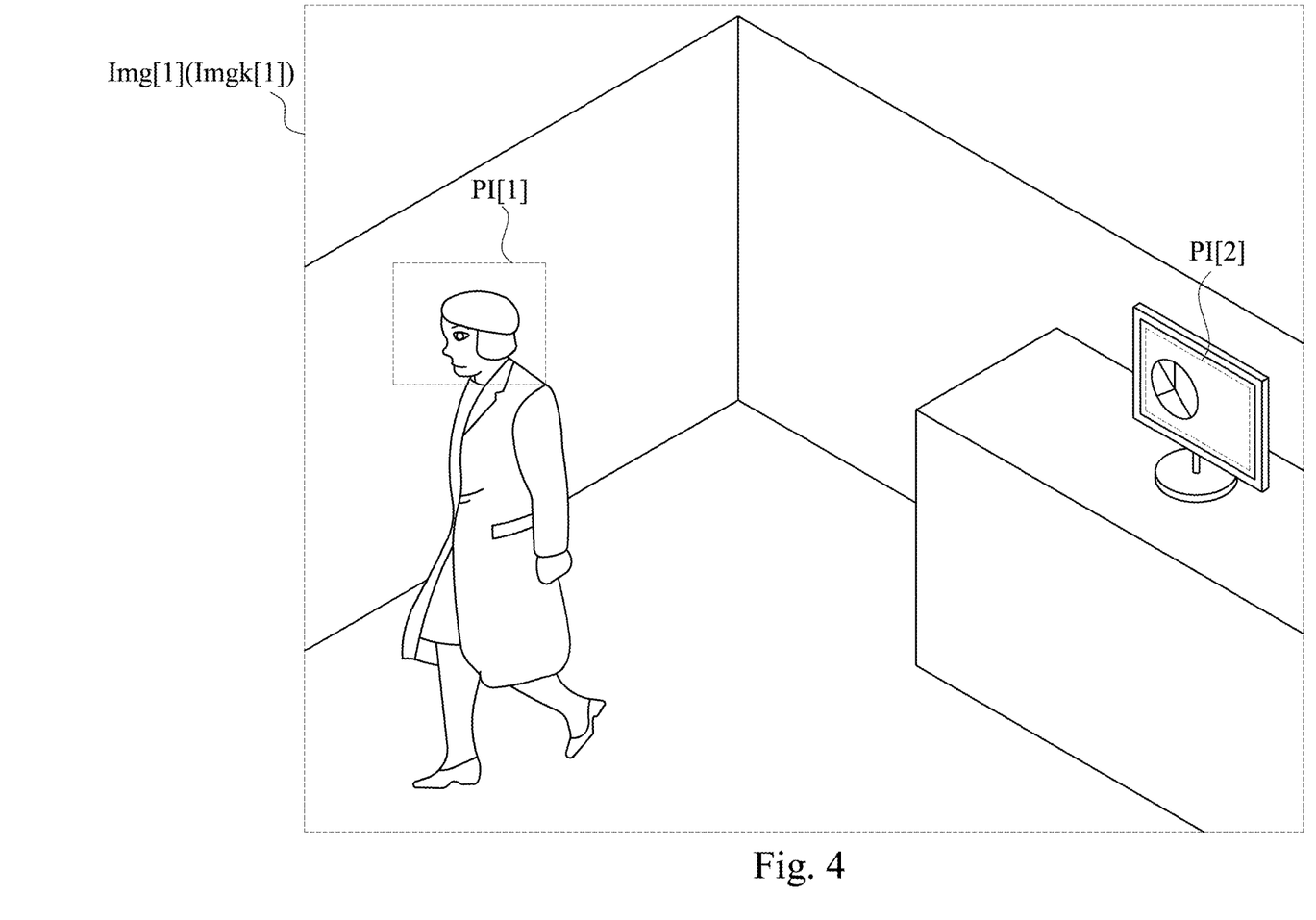
FIG. 4 is a schematic diagram of an image frame captured by the electronic device in accordance with some embodiments of the present disclosure.

In step S301, the processor 203 obtains a key frame, which would be described in detail below with reference to FIGS. 1 and 4. FIG. 4 is a schematic diagram of one image frame Img[1] of the image frames Img captured by the image capturing circuit 201 in accordance with some embodiments of the present disclosure. The image frame Img[1] captured by the image capturing circuit 201 can be corresponding to a field of view V1 as shown in FIG. 1. In some embodiments, the image frame Img[1] is separated from a last/newest key frame (not shown) by a predetermined frame number or more, and an amount of common feature points of the image frame Img[1] with the last key frame is equal to or less than a predetermined threshold. In the described condition, as shown in FIG. 4, the processor 203 determines the image frame Img[1] to be new key frame Imgk[1].

After the key frame Imgk[1] is obtained, step S302 is executed. In step S302, the processor 203 performs the image recognition on the key frame Imgk[1]. In some embodiments, the processor 203 recognizes the key frame Imgk[1] by the privacy content recognition model 213 of FIG. 2. As a result, as shown in FIG. 4, a privacy content PI[1] and a privacy content PI[2] are recognized from the key frame Imgk[1]. In particular, the privacy content PI[1] is corresponding to the portrait of the person U2 in FIG. 1, and the privacy content PI[2] is corresponding to the visual content displayed by the display O1 in FIG. 1.

Figure 5:
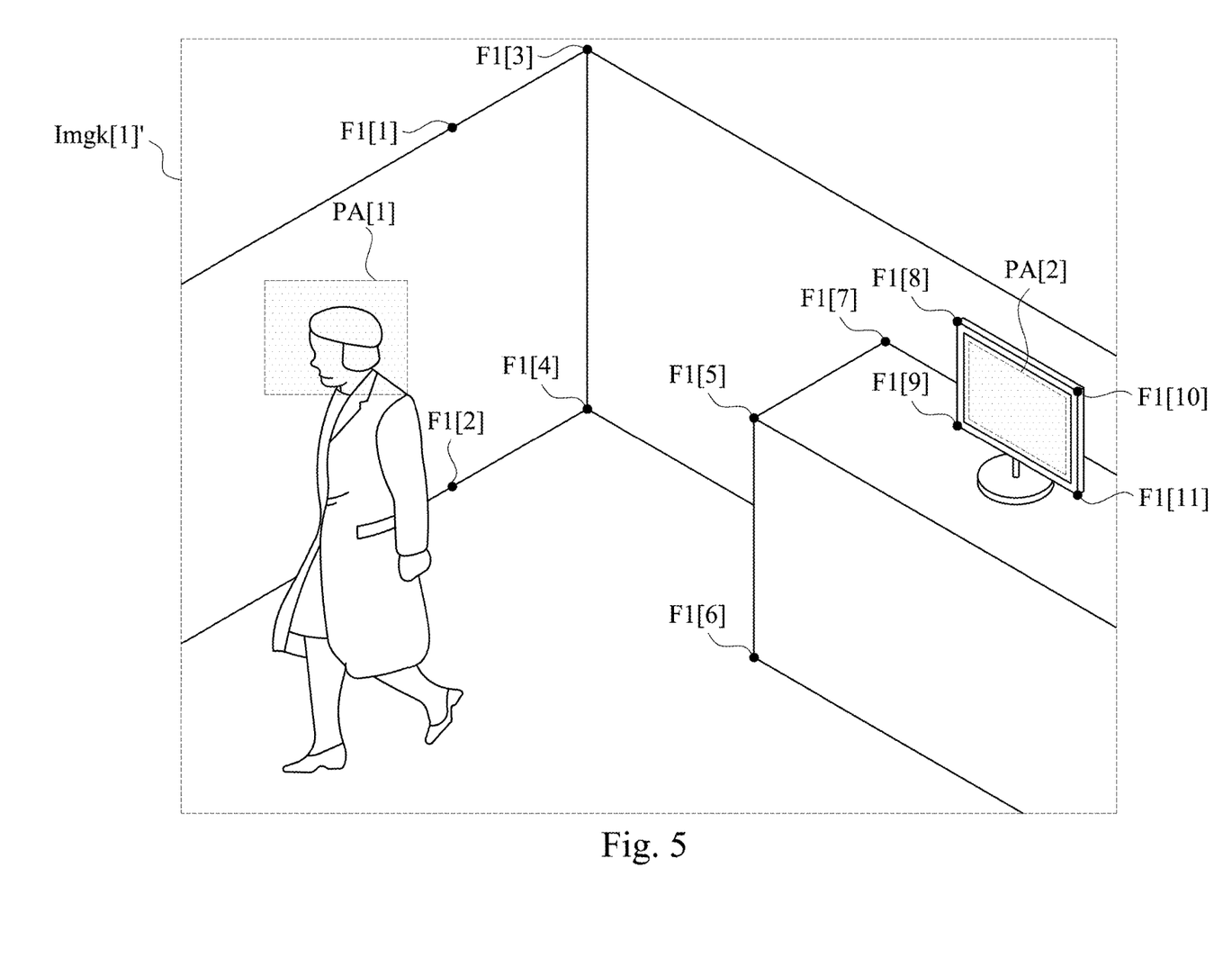
FIG. 5 is a schematic diagram of a modified key frame generated by the electronic device in accordance with some embodiments of the present disclosure.

Based on the result that the key frame Imgk[1] includes the privacy content PI[1] and the privacy content PI[2], the processor 203 have to further process and analyze the key frame Imgk[1]. Thus, step S303 is executed. In step S303, the processor 203 processes the key frame Imgk[1] to generate a modified key frame Imgk[1]', which would be described in detail below with reference to FIGS. 4 and 5. FIG. 5 is a schematic diagram of the modified key frame Imgk[1]' in accordance with some embodiments of the present disclosure. In some embodiments, the processor 203 performs an image smoothing (or image blurring) on the privacy content PI[1] and the privacy content PI[2] in FIG. 4, to generate an image processing area PA[1] and an image processing area PA[2] in FIG. 5. In other words, the modified key frame Imgk[1]' includes the image processing area PA[1] and the image processing area PA[2]. As shown in FIGS. 4 and 5, the image processing area PA[1] is corresponding to the privacy content PI[1], and the image processing area PA[2] is corresponding to the privacy content PI[2].

As can be understood, the number of the privacy contents PI or the number of the image processing areas PA should not be limited thereto. For example, in some embodiments, at least one privacy content PI is recognized from the key frame, and at least one image processing area PA is generated by processing the at least one privacy content PI.

After the modified key frame Imgk[1]' is generated, step S304 is executed. In step S304, the processor 203 analyzes the modified key frame Imgk[1]'. In some embodiments, as shown in FIG. 5, the processor 203 extracts multiple first feature points F1[1]~F1[11] from the modified key frame Imgk[1]', calculates an amount of the first feature points F1[1]~F1[11], and compares the amount of the first feature points F1[1]~F1[11] with another predetermined threshold. As can be seen from the above descriptions, the processor 203 analyzes the modified key frame, to determine whether the amount of the first feature points of the modified key frame is greater than a first threshold (i.e., said another predetermined threshold).

Notably, in some embodiments, because features of the privacy contents PI[1] and PI[2] are eliminated by the image smoothing, the processor 203 is unable to extract any feature points from the image processing areas PA[1] and PA[2] which are generated by performing the image smoothing. Thus, as shown in FIG. 5, the first feature points F1[1]~F1[11] are not extracted from the image processing areas PA[1] and PA[2]. As can be understood, the image smoothing can be replaced by any suitable image processing technologies capable of eliminating features of the privacy content.

In some embodiments, the processor 203 determines that the amount of the first feature points of the modified key frame is greater than the first threshold, so that step S305 is executed. In step S305, the processor 203 uses the modified key frame Imgk[1]' to update the map M1 of the environment E1. As can be understood, the update of the map M1 is well known by person having ordinary skill in art of the present disclosure, and therefore the descriptions thereof are omitted herein. Moreover, in some embodiments, as shown in FIG. 3, step S301 would be executed again after step S305 is executed.

In some embodiments, the processor 203 determines that the amount of the first feature points of the modified key frame is not greater than the first threshold, and then abandons the modified key frame. The modified key frame without enough feature points will be abandoned because it does not provide enough information for updating the map M1 (and/or calculating the location and/or the pose of the electronic device 100 in the map M1). In some further embodiments, the key frame (e.g., the key frame Imgk[1] as shown in FIG. 4) which includes the at least one privacy content PI would also be abandoned due to the at least one privacy content PI. In particular, abandoning the modified key frame (or the key frame) means that the processor 203 might not store the modified key frame (or the key frame) in the storage circuit of the electronic device 100. Accordingly, step S306 is executed.

Figure 6:
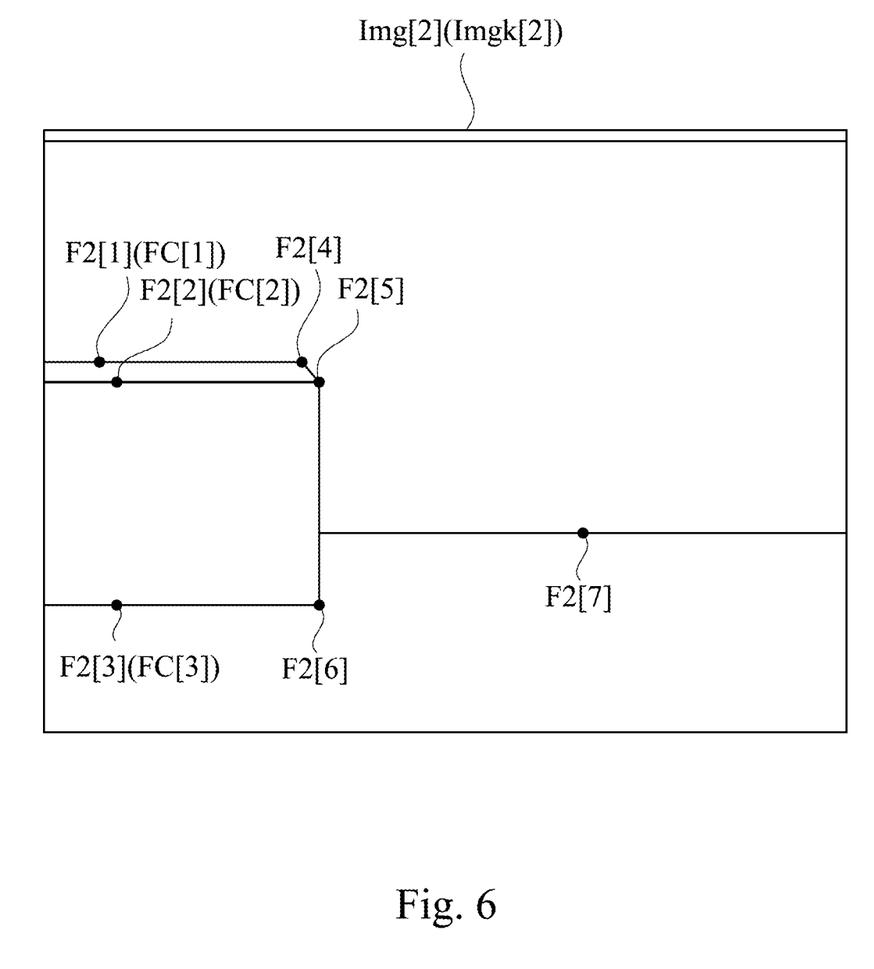
FIG. 6 is a schematic diagram of another image frame captured by the electronic device in accordance with some embodiments of the present disclosure.

In step S306, the processor 203 obtains another key frame, which would be described in detail below with reference to FIGS. 1 and 6. Referring to FIG. 6, FIG. 6 is a schematic diagram of another one image frame Img[2] of the image frames Img captured by the image capturing circuit 201 in accordance with some embodiments of the present disclosure. The image frame Img[2] captured by the image capturing circuit 201 can be corresponding to another field of view V2 as shown in FIG. 1. In some embodiments, the image frame Img[2] is also separated from the last key frame by the predetermined frame number or more. Then, as shown in FIG. 6, the processor 203 extracts multiple second feature points F2[1]-F2[7] from the image frame Img[2] and matches the second feature points F2[1]-F2[7] to multiple map points (not shown) of the map M1 corresponding to the last key frame. In some embodiments, three second feature points F2[1]-F2[3] are found to be matched, and, as a result, can be referred as common feature points FC[1]-FC[3]. In other words, the processor 203 obtains the common feature points FC[1]-FC[3] of the image frame Img[2] with the last key frame. The processor 203 determines whether an amount of the common feature points FC[1]-FC[3] is equal to or less than said predetermined threshold afterwards. In the embodiments of FIG. 6, the amount of the common feature points FC[1]-FC[3] is equal to or less than said predetermined threshold, so that the image frame Img[2] is set as new key frame Imgk[2]. As can be seen from the above descriptions, in the condition that the amount of the common feature points is not greater than a second threshold (i.e., said predetermined threshold), the processor 203 determines the image frame Img[2] to be the key frame Imgk[2].

In some embodiments, as shown in FIG. 3, step S302 would be executed again after new key frame Imgk[2] is set. In some further embodiments, the result of the image recognition on the key frame Imgk[2] shows that the key frame Imgk[2] does not include any privacy content. Thus, the processor 203 does not have to process and analyze the key frame Imgk[2], and step S307 is executed accordingly. In step S307, the processor 203 uses the key frame Imgk[2] to update the map M1 of the environment E1. The update of the map M1 is well known by person having ordinary skill in art of the present disclosure, and therefore the descriptions thereof are omitted herein.

As can be seen from the above descriptions of the data processing method 300, in some embodiments, the data processing method of the present disclosure includes step of obtaining the key frame Imgk[1], step of processing the key frame Imgk[1] to generate the modified key frame Imgk[1]' in the condition that the key frame Imgk[1] includes at least one privacy content (e.g., the privacy content PI[1], the privacy content PI[2], etc.), and step of using the modified key frame Imgk[1]' to update the map M1 of the environment E1. In some further embodiments, the step of using the modified key frame Imgk[1]' to update the map M1 of the environment E1 is performed in the condition that the amount of the first feature points F1[1]-F1[11] of the modified key frame Imgk[1]' is greater than the first threshold.

In the above embodiments, for those image frames Img which are not set as the key frame, the processor 203 only uses the relative relationship between those image frames Img and the last key frame to simply estimate the location and/or the pose of the electronic device 100. Afterwards, those image frames Img might not be preserved, that is, those image frames Img might not be stored in the storage circuit of the electronic device 100. Thus, in some embodiments, the processor 203 does not perform the image smoothing on those image frames Img, even if those image frames Img carry the privacy information.

In the above embodiments, as shown in FIGS. 1, 4 and 5, the processor 203 recognizes the portrait of the person U2 in FIG. 1 as the privacy content PI[1]. However, the present disclosure is not limited herein. For example, in some embodiments, the processor 203 might recognize the entire image of the person U2 (i.e., from head to feet) as the privacy content PI. In such arrangements, the processor 203 might perform the image smoothing on the entire image of the person U2 to generate the image processing area PA correspondingly.

As can be seen from the above embodiments of the present disclosure, by eliminating the features of the privacy contents in the key frame, the operations (e.g., generating and/or updating the map M1, calculating the location and/or the pose of the electronic device 100, etc.) of the processor 203 would not be affected by the privacy information accidentally obtained from the environment E1, which leads to the decrease in the computational complexity and burden of the processor 203. Furthermore, in the condition that the electronic device 100 has to share information (e.g., the modified key frame) related to the environment E1 with other devices so that those devices can also localize themselves in the environment E1, the processor 203 does not need to perform the encryption. In sum, the electronic device 100 and the data processing method 200 of the present disclosure has advantage of improved performance, etc.

The disclosed methods, may take the form of a program code (i.e., executable instructions) embodied in tangible media, such as floppy diskettes, CD-ROMS, hard drives, or any other transitory or non-transitory machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the invention. In view of the foregoing, it is intended that the present invention cover modifications and variations of this invention provided they fall within the scope of the following claims.

What is claimed is:

1. A data processing method, applicable to an electronic device in an environment, and comprising:
    obtaining a key frame;
    in a condition that the key frame comprises at least one privacy content, processing the key frame to generate a modified key frame, wherein the modified key frame comprises at least one image processing area corresponding to the at least one privacy content;
    analyzing the modified key frame, to determine if an amount of a plurality of first feature points of the modified key frame is greater than a first threshold;
    in a condition that the amount of the plurality of first feature points of the modified key frame is not greater than the first threshold, not storing the key frame and the modified key frame in the electronic device; and
    in a condition that the amount of the plurality of first feature points of the modified key frame is greater than the first threshold, using the modified key frame to update a map of the environment.

2. The data processing method of claim 1, further comprising:
    performing an image recognition on the key frame by a privacy content recognition model, to determine if the key frame comprises the at least one privacy content.

3. The data processing method of claim 1, wherein analyzing the modified key frame comprises:
    extracting the plurality of first feature points from the modified key frame;
    calculating the amount of the plurality of first feature points; and
    comparing the amount of the plurality of first feature points with the first threshold.

4. The data processing method of claim 1, further comprising:
    in the condition that the amount of the plurality of first feature points of the modified key frame is not greater than the first threshold, obtaining another key frame.

5. The data processing method of claim 4, wherein obtaining the another key frame comprises:
    extracting a plurality of second feature points from an image frame;
    matching the plurality of second feature points to a plurality of map points of the map, to obtain a plurality of common feature points; and
    in a condition that the amount of the plurality of common feature points is not greater than a second threshold, determining the image frame to be the another key frame.

6. The data processing method of claim 4, wherein after obtaining the another key frame, the data processing method further comprises:
    performing an image recognition on the another key frame by a privacy content recognition model.

7. The data processing method of claim 1, further comprising:
    in a condition that the key frame does not comprise the at least one privacy content, using the key frame to update the map of the environment.

8. The data processing method of claim 1, wherein processing the key frame to generate the modified key frame comprises:

performing an image smoothing or image blurring on the at least one privacy content, to generate the at least one image processing area.

9. An electronic device, comprising:
an image capturing circuit, configured to capture a plurality of image frames; and
a processor, coupled to the image capturing circuit, and configured to:
set one of the plurality of image frames as a key frame;
in a condition that the key frame comprises at least one privacy content, process the key frame to generate a modified key frame, wherein the modified key frame comprises at least one image processing area corresponding to the at least one privacy content;
analyze the modified key frame, to determine if an amount of a plurality of first feature points of the modified key frame is greater than a first threshold;
in a condition that the amount of the plurality of first feature points of the modified key frame is not greater than the first threshold, not store the key frame and the modified key frame in the electronic device; and
in a condition that the amount of the plurality of first feature points of the modified key frame is greater than the first threshold, use the modified key frame to update a map of an environment where the electronic device is.

10. The electronic device of claim 9, wherein the processor is further configured to perform an image recognition on the key frame by a privacy content recognition model, to determine if the key frame comprises the at least one privacy content.

11. The electronic device of claim 9, wherein the processor is further configured to:
extract the plurality of first feature points from the modified key frame;
calculate the amount of the plurality of first feature points; and
compare the amount of the plurality of first feature points with the first threshold.

12. The electronic device of claim 9, wherein the processor is further configured to:
in the condition that the amount of the plurality of first feature points of the modified key frame is not greater than the first threshold, set another one of the plurality of image frames as another key frame.

13. The electronic device of claim 12, wherein the processor is further configured to:
extract a plurality of second feature points from the another one of the plurality of image frames;
match the plurality of second feature points to a plurality of map points of the map, to obtain a plurality of common feature points; and
in a condition that the amount of the plurality of common feature points is not greater than a second threshold, determine the another one of the plurality of image frames to be the another key frame.

14. The electronic device of claim 12, wherein after setting the another one of the plurality of image frames as the another key frame, the processor is further configured to perform an image recognition on the another key frame by a privacy content recognition model.

15. The electronic device of claim 9, wherein the plurality of first feature points are not extracted from the at least one image processing area.

16. The electronic device of claim 9, wherein the processor is further configured to:
in a condition that the key frame does not comprise the at least one privacy content, use the key frame to update the map of the environment.

17. The electronic device of claim 9, wherein the processor is further configured to perform an image smoothing or image blurring on the at least one privacy content, to generate the at least one image processing area.

18. A non-transitory computer readable storage medium with a computer program to execute a data processing method applicable to an electronic device in an environment, wherein the data processing method comprises:
obtaining a key frame;
in a condition that the key frame comprises at least one privacy content, processing the key frame to generate a modified key frame, wherein the modified key frame comprises at least one image processing area corresponding to the at least one privacy content;
analyzing the modified key frame, to determine if an amount of a plurality of first feature points of the modified key frame is greater than a first threshold;
in a condition that the amount of the plurality of first feature points of the modified key frame is not greater than the first threshold, not storing the key frame and the modified key frame in the electronic device; and
in a condition that the amount of the plurality of first feature points of the modified key frame is greater than the first threshold, using the modified key frame to update a map of the environment.

\* \* \* \* \*